May 6, 1958 J. E. WHICKER ET AL 2,833,996

CENTERLINE ROTARY ELECTRICAL CONTACTOR DEVICE

Filed March 30, 1954

INVENTORS:
JOSEPH E. WHICKER
ROBERT W. MANN
BY
G. D. O'Brien
T. L. Styner
ATTYS.

2,833,996
Patented May 6, 1958

2,833,996

CENTERLINE ROTARY ELECTRICAL CONTACTOR DEVICE

Joseph E. Whicker and Robert W. Mann, Indianapolis, Ind.

Application March 30, 1954, Serial No. 419,943

12 Claims. (Cl. 339—2)

(Granted under Title 35, U. S. Code (1952), sec. 266)

The invention described herein may be manufactured and used by or for the Government of the United States of America for governmental purposes without the payment of any royalties thereon or therefor.

This invention relates to rotary electrical contactors and more particularly to contactors for making a plurality of electrical connections between relatively rotatable parts of a device, as a gyroscope and its cage, in which the contactor provides a substantially frictionless centerline contact and is self-adjusting to skew deviations.

The most general means of establishing electrical circuits through relatively rotatable parts, using for example a gyroscope having two degrees of freedom in a cage, is through slip-ring and brush connections. These slip-ring and brush contactors have the disadvantages of producing resistance to the relative rotation of the parts and of being too limited in their current carrying capacity. If the slip-rings and brushes are increased in size to carry higher currents necessary in the control of some devices as gyroscopes, the friction would rise to proportions prohibitive of proper operation, particularly in gyroscopes.

Known centerline contactors all have the conductor strip leads from the center contact area fixed in a predetermined position. In a plurality of such strip leads the contact pressure is individually adjusted which must come within a predetermined tolerance to prevent interference between strip leads. These centerline contactor structures have the disadvantages that the contact pressure of several strip leads will not be uniform causing a variance in current transmission detrimental to the operation of the device. Further, the strip leads and contacts being inherently heat responsive oftentimes causes intermittent connection of the circuit or a complete break in the circuit. Such disadvantages are intolerable in gyroscope systems, or other high precision devices.

In the present invention two contact supporting components including housings are positioned in relatively close side-by-side relation, one of which is adapted to be detachably affixed to one of two relatively rotatable members and the other of which is adapted to be detachably affixed to the other of the relatively rotatable members. While the housings of the contact supporting components are shown and described herein as being cylindrical, it is to be understood that housings of other configurations, as square, triangular, or the like, may be used in practicing this invention. For convenience in illustrating and describing the invention these housings will hereinafter be referred to as cylindrical or tubular.

One of the components is positioned with its cylindrical housing axis coincident with the axis of rotation of the rotatable members, as for example, on the gimbal axis of a constrained gyroscope, which component is the rotary contactor component. The housing of this component has a sector portion thereof removed longitudinally for a greater part of its length and radial cuts or slots angularly spaced about the housing which extend longitudinally of the housing an amount coextensive with the sector opening. In the cylindrical housing in stacked relation are electrically conducting disks and insulation disks. The electrically conducting disks each have their central portion raised and these elements are usually used in pairs with the raised portions adjacent and with the insulation disks positioned between the pairs. The electrically conducting disks each have a connection ear extending outwardly through one of the radial slots for solder connection to a wire conductor and in some modifications to restrict the movement of the disk.

The other of the components is similar to the rotary contactor and its cylindrical housing is fixed, as to the case or a gimbal ring of a gyroscope, for example, except that the radial portion corresponding to the sector cut-out portion is a radial slot or cut in alignment with the two cylindrical housing axes through the sector cut-out portion. The fixed cylindrical housing has electrically conducting disks and connection ears thereon similar to that in the rotary contact housing. Flat electrically conducting strips connect separately each electrically conducting disk in the rotatable contactor housing with one each companion electrically conducting disk in the fixed housing through the slot and sector cut-out portions. The ends of the strips in the fixed housing are disk-shaped to anchor these strips therein. Each stack of electrically conducting disks and insulators are spring pressed together with a predetermined spring force. The rotary contactor component can therefore be rotated throughout a limited arc with the minimum amount of friction and with electrical contact surface sufficient to carry high electrical currents. Where other than cylindrical housings are used, the configuration of the contact and insulation disks can be modified in a corresponding manner to provide the means of stacking and aligning in accordance with the concept of this invention. This invention therefore provides a means for establishing a plurality of circuits between relatively rotatable members of precision devices in a very compact manner.

It is therefore a general object of this invention to provide a self-adjusting contact means for conducting high currents therethrough between relatively rotatable members with a negligible amount of mechanical friction.

These and other objects, advantages, features, and uses will become more apparent as the description proceeds when taken in consideration of the accompanying drawings, in which.

Figures 1, 2:
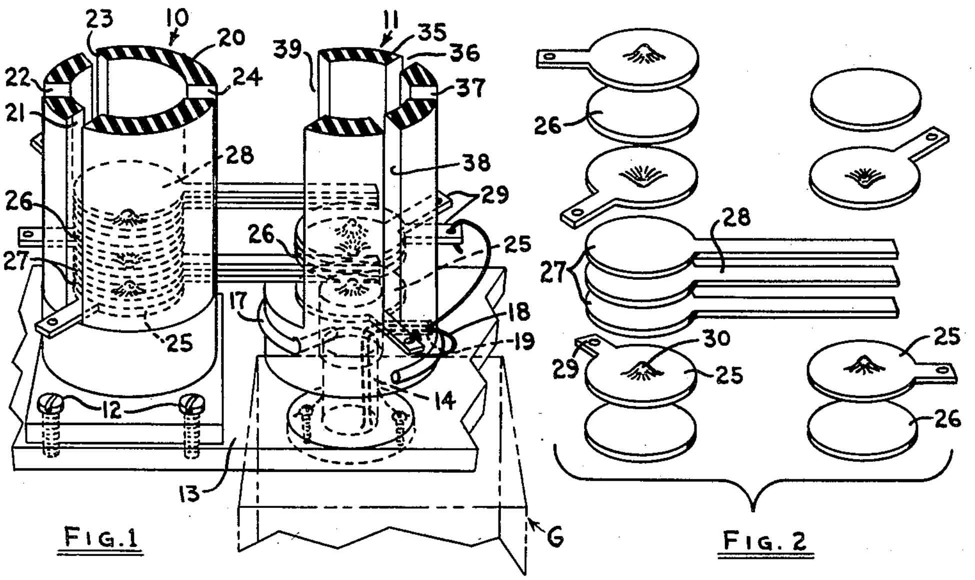
Figure 1 is an isometric view of the rotary contactor means with parts shown broken away, parts in section, and an element shown in phantom.
Figure 2 is an exploded view of the electrical contactor and insulator elements.

Referring now more particularly to Figure 1, there is shown the structural means of the rotary and fixed components of the rotary contactor of this invention. The fixed component 10 and the rotary component 11 are shown as they may be used in the environment of a gyroscope device wherein the component 10 is fixed, as by cap screws 12, to a gimbal ring, or the like, 13. The rotary component 11 is fixed to the end of a hollow trunnion shaft 14 of a gyroscope G which trunnion shaft 14 is journaled in the gimbal ring 13 by a roller-type bearing 15 as is the usual and ordinary means of supporting gyroscopes in the inner gimbal. It is to be understood that the relative rotation between two gimbal rings of a gyroscope or of other relatively rotatable members could accommodate the fixed and rotary components, where desirable, since the disclosure of using these components in the environment shown in Figure 1 is illustrative only. The rotary component 11 is held in position on the end of the hollow trunnion shaft by extending the trunnion shaft 14 into a concentric bore 16 in the base portion of the rotary component and locking it by a lock ring 17 having an end passing through ports or drilled openings radially through the base portion of the rotary component and one wall of the hollow trunnion shaft. The electrical conductors 18 from the gyroscope are passed through the hollow trunnion shaft 14 and through a drilled port 19 in the base portion of the rotary component 11.

Figures 3, 4:
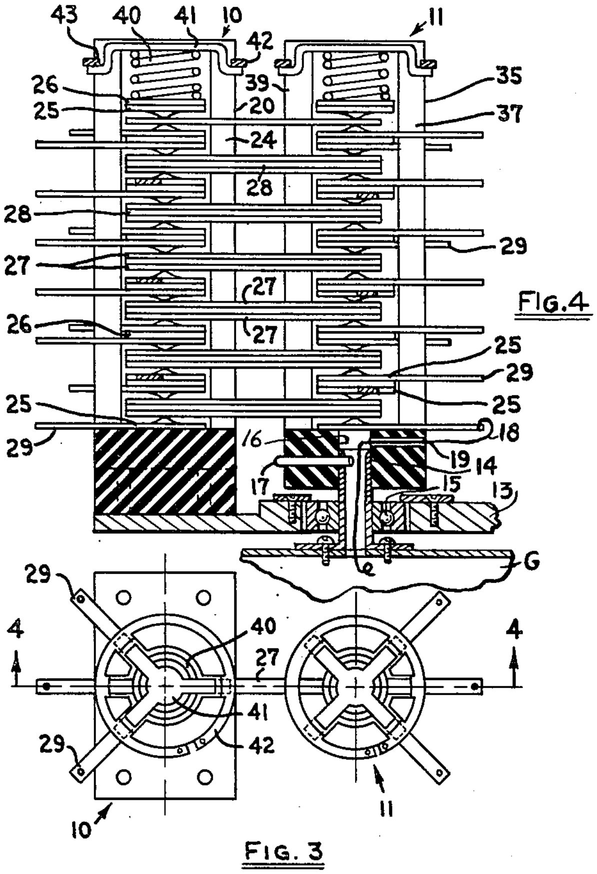
Figure 3 is a top view of the rotary contactor means.
Figure 4 is a cross-sectional view of the rotary contactor means taken along the line 4—4 of Figure 3 and looking in the direction of the arrows.

Referring now more particularly to Figures 1, 2, and 4, the housing members of each of the fixed and rotary components 10 and 11, respectively, are illustrated as tubular housings preferably of a material that is electrically non-conductive. The housing 20 of the fixed component has radial cuts or slots 21, 22, 23, and 24 longitudinally thereof which are angularly spaced in the wall thereof. The cut or slot 24 is in the radial portion of the housing 20 which is adjacent the rotary component for the purpose which will later be more fully understood. In stacked relation within the central area of the tubular housing 20 are contactor disks 25, insulator disks 26, conductor strips 27, and insulator strips 28, the details of which are best seen in Figure 2. The contactor disks 25 each have a connector ear 29 and a raised central portion 30 thereon. The disks 25 are ordinarily arranged in pairs with the raised portions adjacent. The conductor strips 27 are most expeditiously placed on opposite sides of the insulator strip 28 and the three elements placed between the raised portions 30 of the contactor disks 25, as seen in all three Figures 1, 2, and 4. The ends of the conductor strips 27 and the insulator strips 28 in the tubular housing 20 are of disk configuration to anchor these elements in this housing. The other ends of these strips are of uniform widths for the purpose soon to be described.

The rotary component 11, as stated above, is illustrated as a tubular housing 35 with radial cuts or slots 36, 37, and 38 longitudinally thereof which slots or cuts are angularly spaced. These cuts or slots 36, 37, and 38 correspond to the cuts or slots 21, 22, and 23 of the tubular housing 20. In the portion of the tubular housing 35 adjacent the fixed component 10, as seen in Figures 1 and 4, is a sector opening 39 longitudinally of the tubular housing 35. The angle of this sector opening 39 is shown as approximately 90 degrees although the tubular housing may be constructed with the angle of the sector opening 39 more or less than 90 degrees where desirable or where necessity requires it, as will later be disclosed. The contactor disks 25 and insulation disks 26 are stacked in the tubular housing 35 in the same manner as they are stacked in the tubular housing 20 with the ears 29 extending outwardly through the slots 36, 37, or 38. The ends of the conductor and insulator strips 27 and 28 enter through the sector opening 39 and are positioned between the raised portions 30 of the paired contactor disks, as best seen in Figures 2 and 4. As may now be realized, the rotary component 11 may be physically separated from the fixed component 10 for repairs or replacement, or the like. It may also be realized at this point in the description that the rotary component 11 has limited rotation with respect to the fixed component without breaking electrical circuits established through the conductor disks 25 and the associated conductor strips 27, although the operation of the device will be more fully described below.

Referring now more particularly to Figures 3 and 4, the stack of contactor disks, insulator disks, conductor strips, and insulator strips are held together under a light compressive force against the base portion of each tubular body to insure a uniform contact pressure of the contactor elements. Since the means for exerting this force is substantially the same for each component, only one will be described herein. The top or last contactor disk 25 has an insulator disk 26 thereon against which is pressed the end of a compression spring 40. The compression spring 40 is confined at its upper end by a spider element 41 which is held against outward thrust by a snap ring 42 snapped in a circumferential groove 43 near the top of the tubular housing 20. The snap ring 42 just passes over the ends of the spider element 41 which ends preferably terminate in reversed downward turns to prevent any lateral slip thereof.

Figure 5:
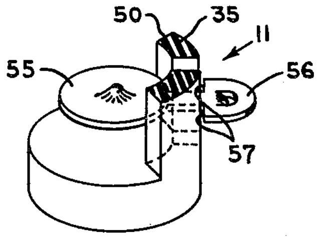
Figure 5 shows an isometric cutaway view of a modification of the rotary component having a large arcuate opening and locked in contactor disks.

As seen in the partial cutaway and sectional view in Figure 5, the tubular housing 35 of the rotary component 11 may be modified to increase the extent of the sector opening 39 of Figures 1 and 4 to an arcuate opening greater than 180 degrees as represented by the reference character 50. When the tubular housing 35 is used having an arcuate opening greater than 180 degrees, the contactor disks are modified as shown by 55 to restrain these disks against lateral displacement. This is accomplished by enlarging the ear portion 56 externally of the radial slot to form shoulders 57 abuttable against the tubular housing 35. In this manner the angular operating limits of the rotary component may be extended to approach 360 degrees.

Figure 6:
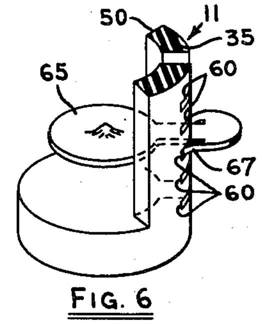
Figure 6 shows an isometric cutaway view of another modification of the rotary component and disk restraining means.
Figure 7:
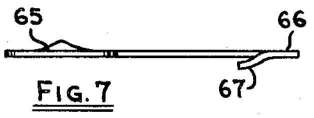
Figure 7 shows a side elevational view of the modified disk illustrated in Figure 6.

Referring to Figures 6 and 7, the cylindrical housing 35 of the rotary component 11 may be further modified for use in rotary contactors utilizing angular rotative limits greater than 180 degrees by cross-slotting the housing 35 along each slot as indicated by the reference character 60. Contactor disks 65 are modified in their connector ear portions 66 over that shown in Figure 5 by having inwardly and downwardly extending projections 67 which loosely snap into the cross-slots 60 of the housing 35. This structure of the contactor disks provides means to space the stacked disks and to prevent contact of the ears of the several stacked disks upon longitudinal movement or tilt of the disk portions within the housing. This structure further provides stops against lateral displacement of the contactor disks in or out of the housing.

It is to be understood that the structures disclosed by Figures 5, 6, and 7 are equally applicable to the cylindrical housing 20 of the component 10, where desirable. Such a structure may be desirable where each component 10 and 11 is attached to a rotatable member since the contactor device of this invention anticipates circuit transmission between relatively rotatable members. It is also to be understood that the slots or cuts 21, 22, 23, 36, 37, and 38 can be increased or decreased in number and angularly positioned to meet the need.

Although the operation of the rotary contactor is believed to be apparent from the above description, a brief description of operation will now be presented for reference. The rotary component 11 is attached to a rotatable element to which various circuits must be established with the minimum amount of friction and resistance. By way of illustration the rotatable element is shown in phantom as a gyroscope G although the disclosed contactor assembly is readily adaptable for general use in other environments. Also, the holding means 17 to support the rotary component on the rotatable element may be replaced by other means as by studs, clamps, or the like, where desirable. The sector opening is shown to be approximately 90 degrees in Figure 1 although this opening may be of smaller angular extent or may be increased to near 360 degrees as illustrated in Figures 5 and 6.

Using Figure 1 as an example, the conductors 18 to the gyroscope rotor are connected, as by soldering, to the ears 29 of the contactor disks 25 on the rotary component 11. Other connections are made, for example, of the self-synchronous or selsyn circuits (not shown) in a like manner. The supply voltages and circuits are completed by connection to the ears 29 on the contactor disks 25 of electrical conductors (not shown) as is well understood in the art. The lowermost contactor disk 25 of the fixed component 10 connects the lowermost contactor element 25 of the rotary component 11 through the lowermost conductor strip 27. The next higher contactor disks 25 in each component are connected by the conductor strip 27 on the topside of the insulation strip 28 of the lowermost group of conductor and insulator strips. Where it is necessary to couple more than one lead across a single conductor strip 27, the insulator strip 28 may be eliminated as shown by the uppermost connection across the fixed and rotary components. A point contact for each pair of contact elements is always maintained regardless of the angular relation of the rotary component 11 with respect to the fixed component. Also the point contact of each pair of contact elements minimizes mechanical friction while at the same time minimizing resistance to electrical current transfer by reason of the compression springs 40 placing a uniform pressure between all contact pairs. It is also to be realized that a slight skew may exist between the fixed and rotary components without causing any change in the established circuit connections. The wiping action between the contactor pairs as by rotational movement and by skewing actions produces only sufficient wear to maintain the contacts clean and free of oxidation. Thus, a very efficient contactor device is disclosed herein where it is essential that the mechanical friction must be held to a minimum and that a high current can be passed without variations in resistance upon rotational changes of the contactor.

While many modifications and changes may be made in the constructional details and features without departing from the spirit and scope of this invention, we desire to be limited only by the scope of the appended claims.

We claim:

1. A multiple contact rotatable contactor device comprising: a pair of electrical contact supporting components in side-by-side relation, one component being rotatable relative to the other component; pairs of contactor elements and insulator elements alternately stacked in each component, said contactor elements in at least said rotatable component each having a point contact surface on a side removed from said insulation elements and on the axis of rotation; means applying a resilient compressive force on said stacks; and conductor strip means lying between said pairs of contactor elements connecting companion contactor elements in each component whereby electrical connections between the companion contact elements are maintained in all rotative positions of said rotatable component.

2. A contactor device as set forth in claim 1 wherein said means applying a compressive force to said stacks is a compression spring.

3. A contactor device as set forth in claim 1 wherein said conductor strip means comprises two electrical conductor strips separated by an electrical insulator strip, said conductor strips and said insulator strips each having anchor means thereon anchoring them to said other component.

4. A contactor device as set forth in claim 1 wherein each component includes a hollow elongated member with radial slots longitudinally thereof through which connecting ears of said contact elements extend, one of these slots in said rotatable member being in the form of a wide angular opening through which said conductor strip means extend; said conductor strip means comprising groups of two electrical conductor strips separated by an electrical insulator strip with the ends thereof within said other component having an enlarged portion to anchor said strips in the hollow of said elongated member; and said means applying a resilient compressive force is a spring in the hollow elongated member of each component.

5. A multiple contact rotatable contactor device comprising: a pair of hollow cylindrically-shaped electrical contact supporting components adapted to be supported in side-by-side relation with one component rotatable in limited angular relation about its axial centerline with respect to the other component, said cylindrically-shaped components each having longitudinal slots therein one of said slots in said rotatable component being in the form of a sector opening; contactor disks and electrical insulating disks in stacked relation in the hollow portion of each of said cylindrically-shaped components, each contactor disk having a raised portion centrally thereof and each stack arranged in the order of an insulating disk and two contactor disks with the raised portions adjacent; and each contactor disk having a connector ear guide extending through one of said longitudinal slots; and a plurality of conductor strip means extending through one of said longitudinal slots of said other component and said sector opening of said rotatable component and resting between said raised portions of said contactor disks in both components with the ends thereof in said other component being circular to anchor said conductor strip means therein whereby a point electrical contact is maintained between corresponding contactor disks of said other and rotatable components for all relative angular positions and skew relations thereof.

6. A contactor device as set forth in claim 5 wherein said conductor strip means comprises a pair of electrical conductor strips separated by an electrical insulator strip whereby corresponding lower and upper contactor disks in each component are electrically connected.

7. A contactor device as set forth in claim 5 wherein the connecting ear guide on said contactor disks has an enlarged portion on the outer end thereof to confine said disks in said other hollow cylindrical component against radial displacement.

8. A contactor device as set forth in claim 5 wherein the cylindrically-shaped rotatable component is cross-slotted along said longitudinal slot opposite said sector opening and the ear guides on said disks are enlarged on the outer end thereof with inwardly directed, downwardly turned lips loosely engaged in said cross-slots.

9. A multiple contact rotatable contactor device comprising: a hollow electrically non-conductive member having a plurality of longitudinal slots and a wide longitudinal opening therein, said member adapted to be fixed on an element rotatable about an axis; a plurality of flat contact elements in electrically insulated stacked relation in said hollow member, said contact elements each having an ear-guide extending outwardly through one of said slots and having a raised central portion lying on the axis; flat conductor strips, each having one end resting on the raised portion of at least one contactor element and the other end extending outwardly through said wide opening, and each contactor element and conductor strip being insulated from the others; and means resiliently compressing the stacked contactor elements together whereby the hollow member may be rotated a limited amount and the electrical contacts maintained without swinging said conductor strips.

10. A contactor device as set forth in claim 9 wherein said ear-guide on said contactor elements has an enlarged portion on the outer end thereof to confine said elements radially in said longitudinal slots.

11. A contactor device as set forth in claim 9 wherein said longitudinal slots are cross-slotted and said ear-guides on said contactor elements are enlarged on the outer end thereof with inwardly directed lips loosely fitted in said cross-slots.

12. A contactor device as set forth in claim 9 wherein said hollow electrically non-conducting member is tubular and the rotatable axis lies on the tubular axis, said flat contact elements are disks with insulator disks electrically insulating them in said stacked relation, and said means resiliently compressing the stacked contactor disks together is a compression spring between the stack of contactor disks and the end of said tubular member.

References Cited in the file of this patent

UNITED STATES PATENTS

| | | |
|---|---|---|
| 2,198,023 | Bode et al. | Apr. 23, 1940 |
| 2,227,123 | Christen | Dec. 31, 1940 |
| 2,319,443 | Corte | May 18, 1943 |
| 2,654,869 | Mudd | Oct. 6, 1953 |

FOREIGN PATENTS

| | | |
|---|---|---|
| 622,263 | Great Britain | June 16, 1940 |